UNITED STATES PATENT OFFICE.

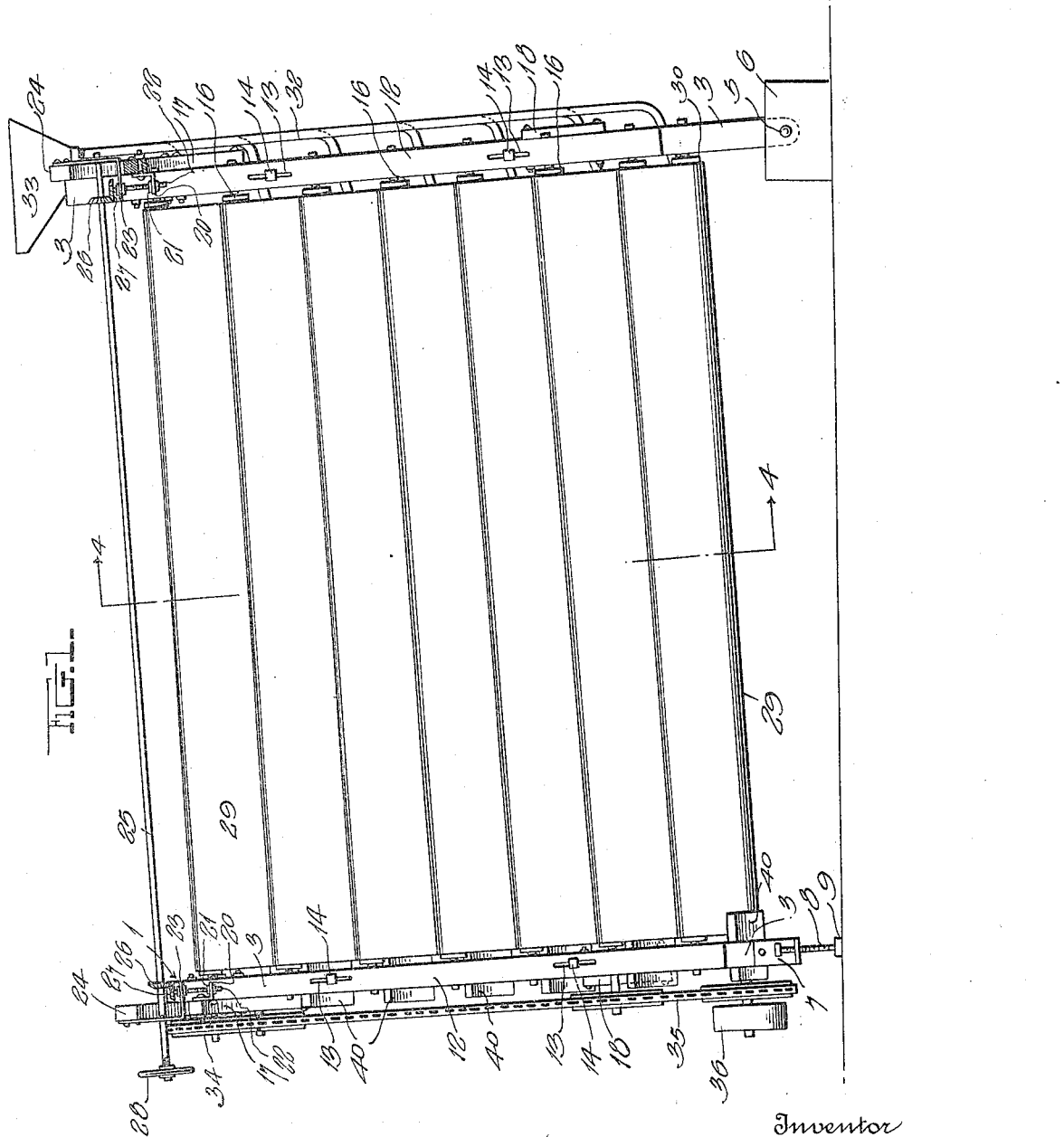

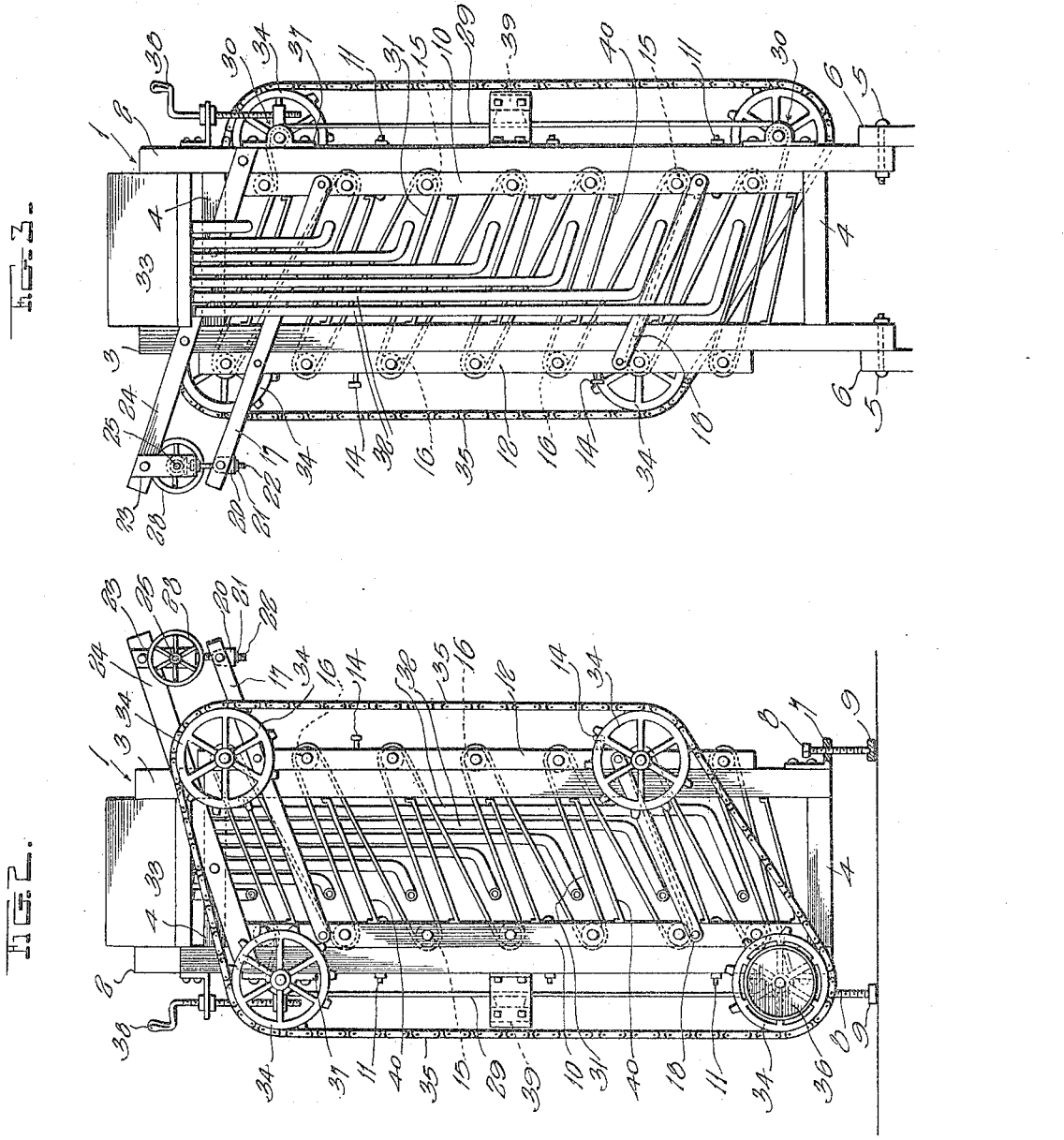

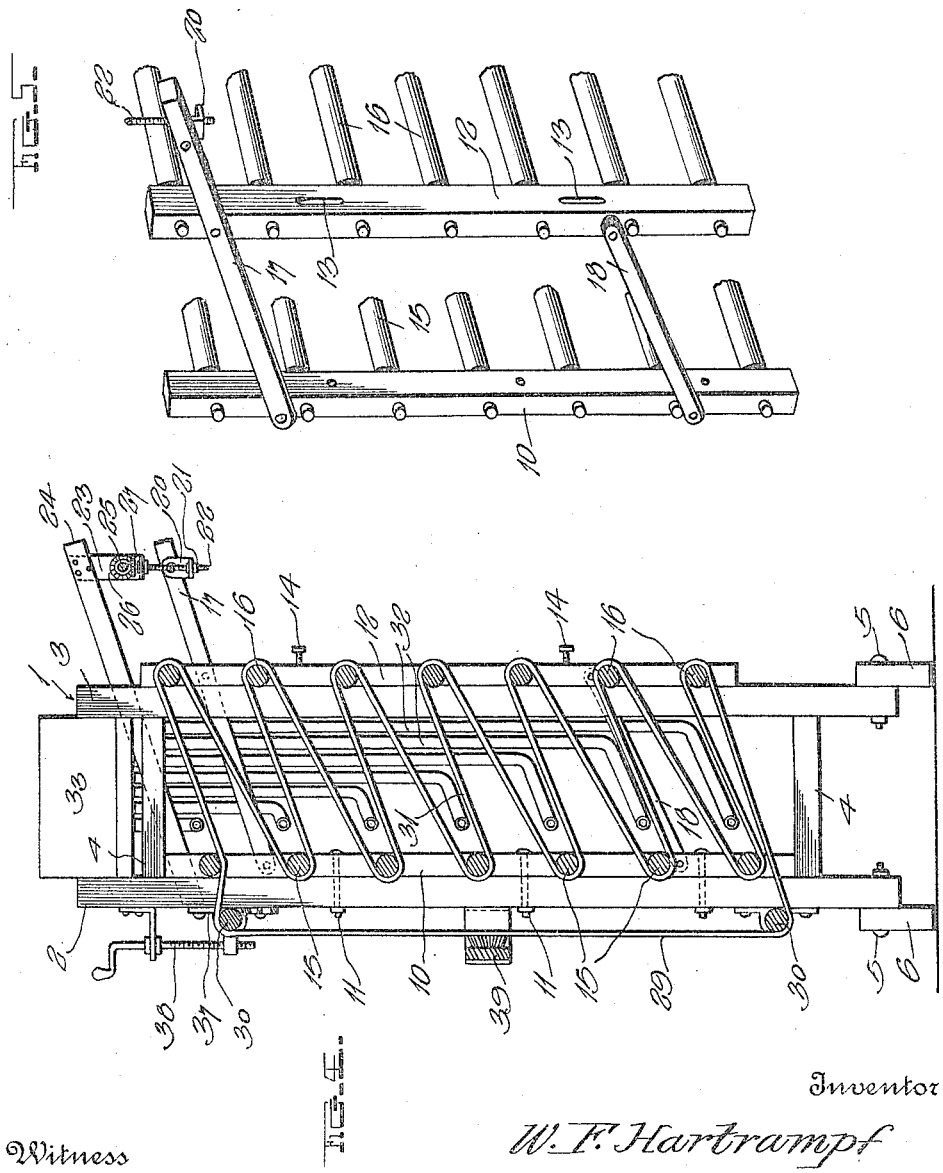

WILLIAM F. HARTRAMPF, OF FOREST GROVE, OREGON.

SEED CLEANER AND SEPARATOR.

1,213,101.

Specification of Letters Patent.  Patented Jan. 16, 1917.

Application filed July 3, 1916. Serial No. 107,394.

*To all whom it may concern:*

Be it known that I, WILLIAM F. HARTRAMPF, a citizen of the United States, residing at Forest Grove, in the county of Washington and State of Oregon, have invented certain new and useful Improvements in Seed Cleaners and Separators; and I do declare the following to be a full, clear, and exact description of the invention, such as will enable others skilled in the art to which it appertains to make and use the same.

My invention relates to improvements in machines for cleaning seed and separating it from chaff and the like with which it is mixed, the object being to provide a comparatively simple and inexpensive machine which regardless of these advantageous characteristics will be highly efficient and durable.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a front elevation of a machine constructed in accordance with my invention; Figs. 2 and 3 are end elevations; Fig. 4 is a central transverse sectional view taken on the plane of the line 4—4 of Fig. 1; and, Fig. 5 is a perspective view of the roller carrying bars to be described and the adjusting means for one of said bars.

In specifically describing the construction shown in the drawings above briefly described, similar characters will be placed on corresponding parts throughout the several views and reference will be herein made to the numerous elements by their respective indices. To this end, the numeral 1 designates the frame of the improved machine, which frame includes a pair of spaced rear standards 2 standing substantially upright but inclined to some extent toward one end of the machine. Similarly positioned front standards 3 are spaced in advance of the standards 2 and rigidly held by transverse bars 4. The standards 2 and 3 at one end of the machine are pivoted by bolts or the like 5 to feet 6 which are adapted to rest on the floor of a barn or the like while the standards at the other end of the machine are equipped with L-shaped brackets 7 through whose horizontal portions upright jack screws 8 are threaded, the lower ends of said screws preferably resting in metallic socket members 9 which will bear on the aforesaid floor.

Rear vertically disposed bars 10 are secured by bolts or the like 11 to the front sides of the standards 2 while front upright bars 12 are mounted for vertical shifting adjacent the front sides of the standards 3, said bars 12 preferably having slots 13 receiving lag screws or the like 14 which guide them in their vertical movement. A rear series of slightly inclined rollers 15 extend between and are rotatably supported by the rear bars 10 while similarly positioned rollers 16 are supported by the front bars 12, said rollers 16 being disposed in planes above the rollers 15 as shown, the distance between such planes being controlled by the vertical adjustment of the bars 12 in the manner to be described.

Upper and lower parallel transverse links 17 and 18 are pivoted to the bars 10 and 12, the upper links being extended forwardly beyond said bars 12 and being shown in the present embodiment of the invention as provided with L-shaped brackets 20 pivoted thereto and carrying nuts 21, jack screws 22 being threaded through said nuts. The screws 22 are supported rotatably by angle iron brackets 23 which depend from the front ends of rigid transverse bars 24, the latter being secured to the front and rear standards of the frame 1 and preferably inclining upwardly and forwardly. The brackets 23 rotatably support a longitudinally disposed shaft 25 upon which bevel gears 26 are secured, said gears meshing with similar gears 27 secured to the upper ends of the screws 22 whereby rotation of the shaft 25 by means of a hand wheel or the like 28 will simultaneously adjust both links 17 vertically, the result being that the bar 12 will be similarly moved.

An endless belt 29 of canvas or other suitable material is trained around the rollers 15 and 16 and around other rollers 30 adjacent the rear of the frame 1, said belt thus having a plurality of upwardly and forwardly inclined reaches 31 upon which the chaff and seed to be separated are deposited by means of tubes 32 depending from a suitable hopper 33. Sprocket wheels 34 are secured to one end of the rollers 30 and to the upper and lower rollers 16, a sprocket chain 35 being trained around said wheels whereby they will all be rotated in unison to drive the belt 29 when power is applied to the machine by a pulley 36 on the shaft of the roller 30 or by any other preferred means. The bearings of the uppermost roller 30, which bearings are designated at 37, are mounted for vertical movement and may be adjusted by the provision of screws or the like 38. The function of this arrangement is that the belt 29 and chain 35 may be tightened when necessary.

Preferably used in conjunction with the parts above described is a brush 39 which is mounted in rear of the frame 1 and engages the belt 29 to clean the latter of all chaff and the like which may have adhered thereto.

In use, the hand wheel 28 will be rotated to adjust the front bars 12 vertically to the proper extent for giving the necessary transverse inclination to the reaches 31 of the belt 29 and the jack screws 8 will also be turned to impart the required longitudinal inclination to said reaches. These adjustments having been made, the machine will be driven and the chaff and seed to be separated will be fed into the hopper 33 from which it travels onto the reaches 31 at the lower ends of the latter. These reaches will now convey all chaff and the like upwardly and discharge it at the front side of the machine but the seed will remain adjacent the rollers 15 and will travel along the belt to the discharge end of the machine, suitable chutes 40 being preferably provided for guiding the discharged seed into sacks, measures or other suitable receptacles. The members 40 are merely shown for illustrative purposes and it is to be understood that any desired means may be employed for receiving the cleaned seed from the machine.

From the foregoing, taken in connection with the accompanying drawings, it will be obvious that although the machine is comparatively simple and inexpensive, it will be efficient and durable. Particular emphasis is laid upon the mounting and manner of adjusting the rollers 15 and 16 in view of the extreme simplicity of this arrangement. The mounting of the entire frame 1 constitutes another rather important feature of the invention.

In the foregoing, a number of specific details have been shown and described for accomplishing probably the best results and in the accompanying drawings such details have been illustrated, but it is to be understood that within the scope of the invention as claimed, numerous changes may be made without sacrificing the main advantages thereof.

I claim:—

A seed cleaning machine comprising a frame including a pair of vertically movable upright bars, vertically spaced rollers whose ends are supported by said bars, and a seed handling belt having portions trained around the rollers; upper and lower parallel links at each end of the frame pivoted at their rear ends to said frame and pivoted at or near their front ends to said vertically movable bars, the upper links being extended forwardly beyond said bars, rigid arms projecting forwardly from the frame above said upper links, a longitudinally disposed shaft carried by said arms, and means operable from said shaft for raising and lowering the upper links in unison, said means being connected with the projecting front ends of said links.

In testimony whereof I have hereunto set my hand in the presence of two subscribing witnesses.

WILLIAM F. HARTRAMPF.

Witnesses:
JOHN SHAW,
PORTIA M. GOODRICH.

Copies of this patent may be obtained for five cents each, by addressing the "Commissioner of Patents, Washington, D. C."